United States Patent
Lee et al.

(10) Patent No.: US 9,628,132 B2
(45) Date of Patent: Apr. 18, 2017

(54) CASE APPARATUS

(71) Applicant: LG INNOTEK CO., LTD., Seoul (KR)

(72) Inventors: Yun Bok Lee, Seoul (KR); Yong Suk Chae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/740,960

(22) Filed: Jun. 16, 2015

(65) Prior Publication Data
US 2015/0381225 A1   Dec. 31, 2015

(30) Foreign Application Priority Data
Jun. 30, 2014   (KR) .................. 10-2014-0080823

(51) Int. Cl.
*H04W 4/00* (2009.01)
*H04B 1/3888* (2015.01)

(52) U.S. Cl.
CPC .......... *H04B 1/3888* (2013.01); *H04W 4/008* (2013.01)

(58) Field of Classification Search
CPC ...... H04B 1/04; H04B 1/3878; H04B 1/3888; H04B 5/0081; H04W 4/008; H01F 38/14; H01Q 1/243; H01Q 1/38; H01Q 7/06; G08B 13/2468; G08B 13/2448; G06F 1/1616
See application file for complete search history.

(56) References Cited

U.S. PATENT DOCUMENTS

| | | | |
|---|---|---|---|
| 2008/0303632 A1* | 12/2008 | Hammad | G06F 1/1616 340/10.1 |
| 2009/0085706 A1 | 4/2009 | Baarman et al. | |
| 2009/0170559 A1* | 7/2009 | Phillips | H01Q 1/243 455/556.1 |
| 2012/0098349 A1 | 4/2012 | Kim et al. | |
| 2015/0126112 A1* | 5/2015 | Park | H02J 7/00 455/41.1 |
| 2015/0268742 A1* | 9/2015 | Park | G06F 3/03545 345/179 |

FOREIGN PATENT DOCUMENTS

| | | | |
|---|---|---|---|
| KR | 2012-0040779 A | 4/2012 | |
| KR | 10-2014-0018523 A | 2/2014 | |

* cited by examiner

*Primary Examiner* — Thanh Le
(74) *Attorney, Agent, or Firm* — Saliwanchik, Lloyd & Eisenschenk

(57) ABSTRACT

The embodiment relates to a case apparatus including a mounting member, which includes a first mounting member and a second mounting member surrounding the first mounting member; a first antenna device mounted on a top surface of the first mounting member; and a second antenna device mounted on a bottom surface of the second mounting member. Thus, even when the case apparatus is mounted on a mobile communication terminal, short range communication may be smoothly performed between the mobile communication terminal and an external device.

17 Claims, 9 Drawing Sheets

(a)

(b)

CASE APPARATUS

CROSS-REFERENCES TO RELATED APPLICATION

This application claims the benefit under 35 U.S.C. §19 of Korean Patent Application No. 10-2014-0080823, filed Jun. 30, 2014, which is hereby incorporated by reference in its entirety.

BACKGROUND

Technical Field

The embodiment relates to a case apparatus, and more particularly, to a case apparatus mountable on a mobile communication terminal.

In general, various functions are added to a mobile communication terminal to provide various services. In this case, the mobile communication terminal may have a short range communication function. In other words, the mobile communication terminal may approach an external device to perform a short range communication with the external device. In this case, the mobile communication terminal may perform the short range communication with the external device to provide a payment service or an authentication service. Meanwhile, recently, a case apparatus which is mountable on the mobile communication terminal has been realized. In this case, the case apparatus may be used to protect the mobile communication terminal or improve the appearance.

However, the case apparatus may interfere with the short range communication between the mobile communication terminal and the external device. That is, the case apparatus may block a signal transceived by the mobile communication terminal. Accordingly, the case apparatus may degrade the performance of the mobile communication terminal.

BRIEF SUMMARY

Therefore, the embodiment provides a case apparatus for preventing the performance of the mobile communication terminal from being degraded. In addition, the embodiment provides a case apparatus for relaying a signal transceived by the mobile communication terminal. Further, the embodiment provides a case apparatus for relaying a short range communication between a mobile communication terminal and an external device.

To achieve the objects, the case apparatus according to the embodiment includes a mounting member including a first mounting member and a second mounting member surrounding the first mounting member; a first antenna device mounted on a top surface of the first mounting member; and a second antenna device mounted on a bottom surface of the second mounting member.

The first mounting member is connected to one side of the second mounting member.

The case apparatus further includes a correction member disposed between the first and second mounting members.

The correction member may include a battery.

The first mounting member extends along one of side surfaces of the correction member.

The first and second antenna devices are connected to each other.

According to the embodiment, the case apparatus is mountable on the mobile communication terminal to protect the mobile communication terminal and improve the appearance of the mobile communication terminal. In addition, the case apparatus may relay the short range communication between the mobile communication terminal and the external device. That is, the case apparatus may relay the signal transceived by the mobile communication terminal. Thus, even when the case apparatus is mounted on the mobile communication terminal, the short range communication may be smoothly performed between the mobile communication terminal and the external device. Thus, the performance of the mobile communication terminal may be prevented from being degraded due to the case apparatus.

DETAILED DESCRIPTION

Figure 1:
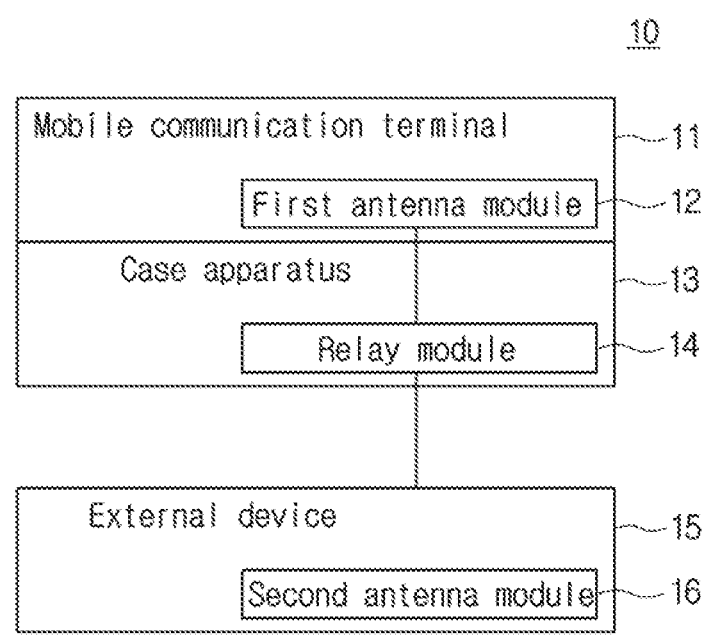
FIG. 1 is a block diagram showing a communication system employing the embodiment.

Hereinafter, the embodiments will be described in more detail with reference to accompanying drawings. In this case, it should be noted that the same reference numerals are assigned to the same elements as much as possible. In addition, the details of well-known functions or configurations that may make the subject matter of the embodiments unclear will be omitted in the following description.

Figure 2:
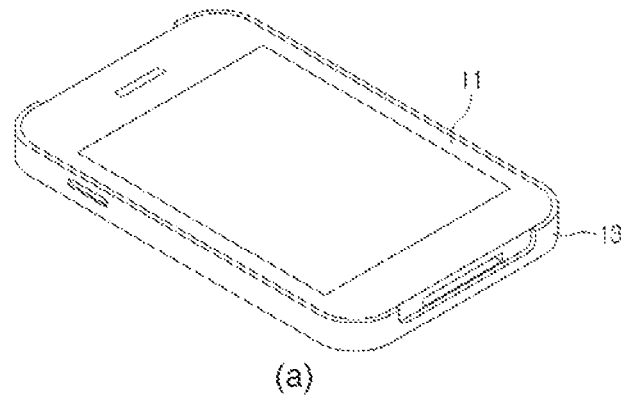
FIG. 2 is a perspective view showing examples of a case apparatus according to the embodiments.
Figure 2:
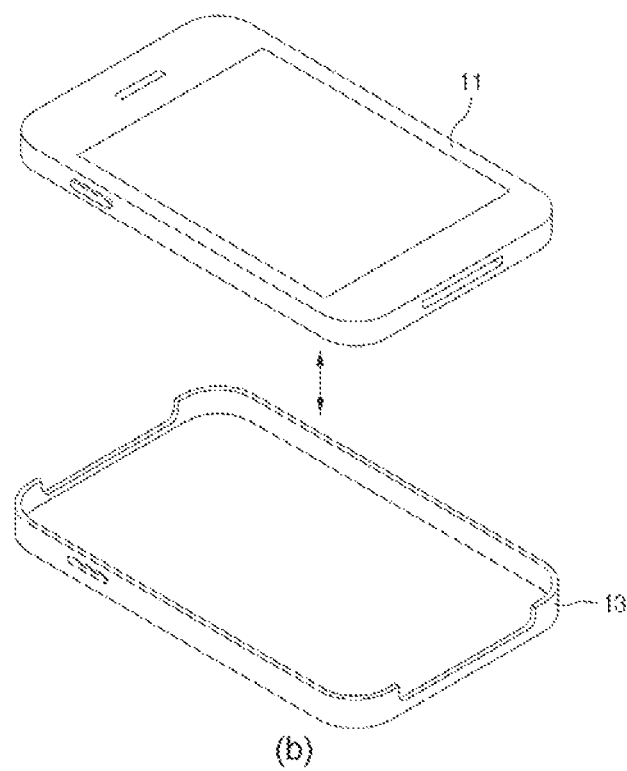

FIG. 1 is a block diagram showing a communication system employing the embodiment. In addition, FIG. 2 is a perspective view showing a case apparatus according to the embodiment. In this case, FIG. 2 (a) shows the case apparatus mounted on a mobile communication terminal, and FIG. 2 (b) shows the case apparatus detached from the mobile communication terminal.

Referring to FIG. 1, the communication system 10 employing the embodiment includes a mobile communication terminal 11, a case apparatus 13 and an external device 15.

The mobile communication terminal 11 and the external device 15 may perform short range communication. That is, as the mobile communication terminal 11 approaches the external device 15, the mobile communication terminal 11 and the external device 15 may perform the short range communication. In this case, the short range communication may include NFC (Near Field Communication). To this end, the mobile communication terminal 11 may include a first antenna module 12 and the external device 15 may include a second antenna module 16. Thus, when the mobile communication terminal 11 approaches the external device 15, the first antenna module 12 and the second antenna module 16 may perform the short range communication.

For example, the mobile communication terminal 11 may include a smart card, a portable phone, a smart phone, a netbook, a laptop computer, etc. In addition, the external device 15 may be various kinds of electronic devices each including a reader.

The case apparatus 13 is mountable on the mobile communication terminal 11. In other words, the case apparatus 100 may be mounted on the mobile communication terminal 11 as shown in (a) of FIG. 2. In this case, the case apparatus 13 may be mounted on the mobile communication terminal 11 to protect the mobile communication terminal 11 and improve the appearance of the mobile communication terminal 11. In addition, as shown in (b) of FIG. 2, the case apparatus 13 may be detached from the mobile communication terminal 11.

In addition, the case apparatus 13 may be mounted on the mobile communication terminal 11 to relay the short range communication between the mobile communication terminal 11 and the external device 15. That is, the case apparatus 13 may receive a signal from the mobile communication terminal 11 and transfer the signal to the external device 15. In addition, the case apparatus 13 may receive a signal from the external device 15 and transfer the signal to the mobile communication terminal 11. To this end, the case apparatus 13 may include a relay module 14. Thus, when the mobile communication terminal 11 approaches the external device 15, the relay module 14 may relay the short range communication between the first and second antenna modules 12 and 16.

Figure 3:
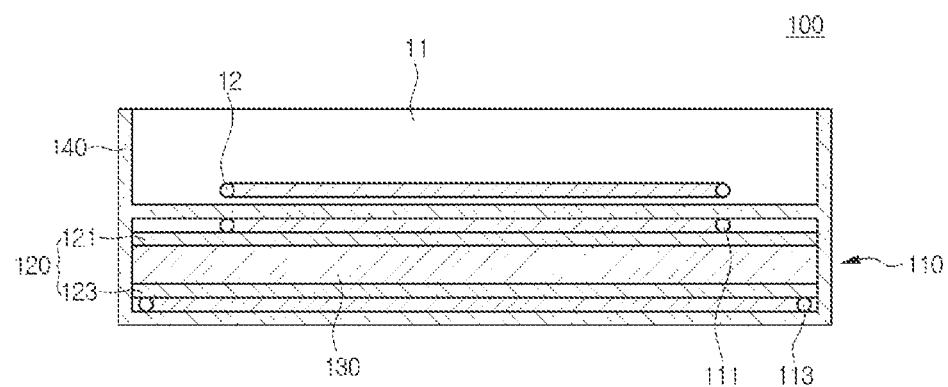
FIG. 3 is a sectional view showing a case apparatus according to the first embodiment.
Figure 4A:
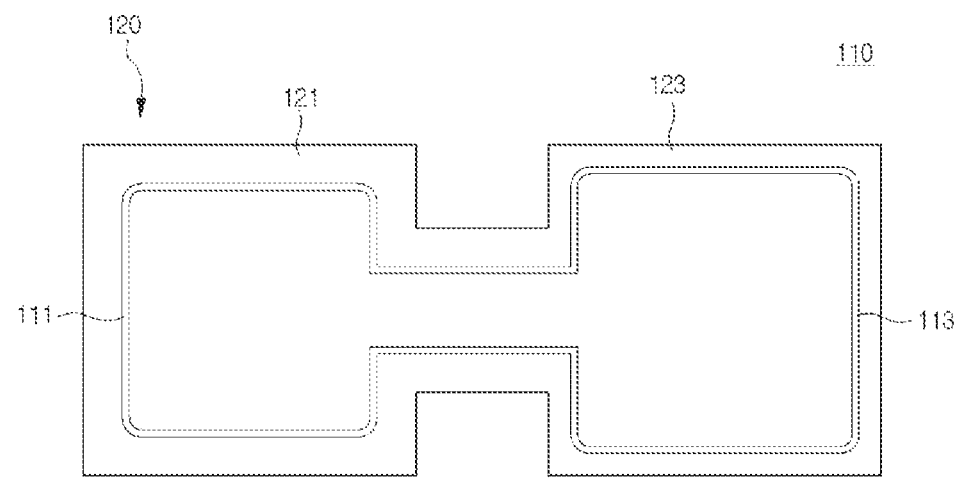
FIGS. 4a, 4b and 4c are views showing the relay module of FIG. 3.
Figure 4B:
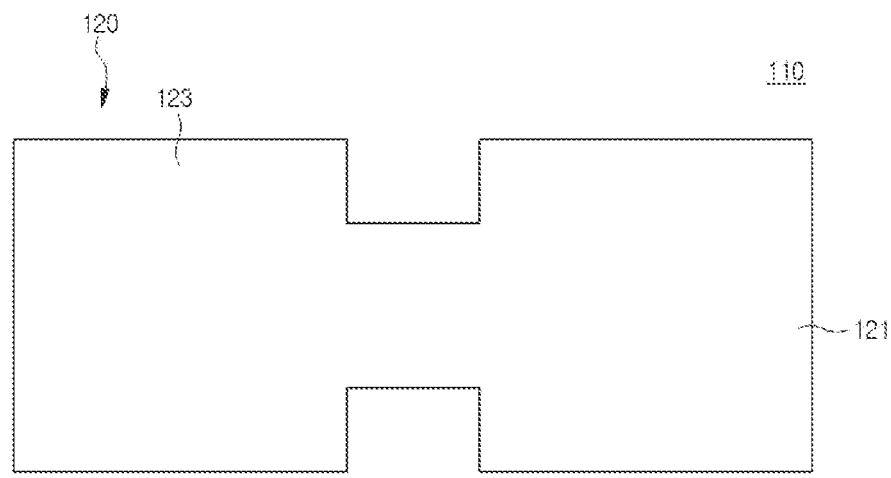
Figure 4C:
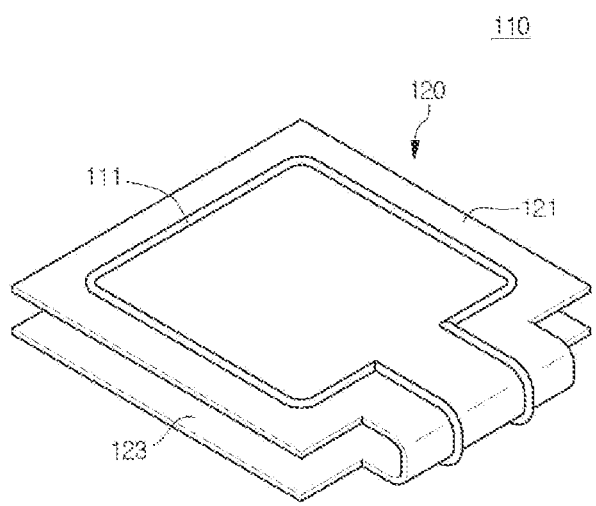

FIG. 3 is a sectional view showing a case apparatus according to the first embodiment. In addition, FIGS. 4a, 4b and 4c are views showing the relay module of FIG. 3. In this case, FIGS. 4a and 4b illustrate a scheme of manufacturing the relay module, where FIG. 4a is a plan view showing a top surface of the relay module and FIG. 4b is a back view showing a bottom surface of the relay module. In addition, FIG. 4c is a perspective view illustrating a scheme of assembling the relay module.

Referring to FIG. 3, the case apparatus 100 of the embodiment includes the relay module 110, a correction member 130 and a protective part 140.

The relay module 110 relays the signal in the case apparatus 100. That is, the relay module 110 relays the short range communication between the mobile communication terminal 11 and the external device 15 (in FIG. 1). In detail, the relay module 110 performs the short range communication with the mobile communication terminal 11, and performs the short range communication with the external device 15. In this case, the short range communication may include NFC (Near Field Communication). The relay module 110 includes antenna devices 111 and 113 and a mounting member 120.

The antenna devices 111 and 113 substantially transfer signals. In this case, the antenna devices 111 and 113 may receive a signal from the mobile communication terminal 11 and transfer the signal to the external device 15. In addition, the antenna devices 111 and 113 may receive a signal from the external device 15 and transfer the signal to the mobile communication terminal 11.

The antenna devices 111 and 113 include first and second antenna devices 111 and 113. The first antenna device 111 is disposed opposite the mobile communication terminal 11 in the case apparatus 100. In addition, the first antenna device 111 may perform the short range communication with the mobile communication terminal 11. That is, the first antenna device 111 exchanges a signal with the mobile communication terminal 11. In this case, the first antenna device 111 may receive a signal from the first antenna module 12 (in FIG. 1) or transfer a signal to the first antenna module 12. The second antenna device 113 is disposed opposite the first antenna device 111 in the case apparatus 100. In addition, the second antenna device 113 may perform the short range communication with the external device 15. That is, the second antenna device 113 exchanges a signal with the external device 15. In this case, the second antenna device 113 may receive a signal from the second antenna module 16 (in FIG. 1) or transfer a signal to the second antenna module 16.

In this case, the first and second antenna devices 111 and 113 may be connected to each other. In addition, each of the first and second antenna devices 111 and 113 may include a coil. In this case, ends of the first antenna device 111 may be connected to ends of the and second antenna device 113. In addition, the first and second antenna devices 111 and 113 may form a loop. Selectively, at least one of the first and second antenna devices 111 and 113 may further include a reactance device (not shown). In this case, the reactance device may be connected to the coil. In addition, the reactance device may include an induction device and a capacitance device. For example, the induction device may include an inductor and the capacitance device may include a capacitor.

The mounting member 120 supports the antenna devices 111 and 113. In addition, the mounting member 120 may shield the antenna devices 111 and 113. In the case, the mounting member 120 is interposed between the antenna devices 111 and 113. The mounting member 120 may separate the antenna devices 111 and 113 from each other. In addition, the mounting member 120 may be formed in a single-layered structure or a multi-layered structure. Thus, the first and second antenna devices 113 are disposed opposite each other while interposing the mounting member 120 therebetween.

In this case, the mounting member 120 may include one of a printed circuit board (PCB), a flexible PCB (FPCB), a film and a shielding member. The shielding member may be formed of ferrite. That is, the shielding member may include metallic particles and a resin material. In this case, the metallic particles may include soft magnetic metallic particles, for example, aluminum (Al), metal silicon and iron oxide (FeO; Fe3O4; Fe2O3). In addition, the resin material may include thermoplastic resin such as polyolefin elastomer.

The mounting member 120 includes first and second mounting members 121 and 123. The first mounting member 121 is disposed opposite the mobile communication terminal 11 in the case apparatus 100. The first mounting member 121 supports the first antenna device 111. The second mounting member 123 is disposed opposite the first mounting member 121 in the case apparatus 100. The second mounting member 123 supports the second antenna device 113. In this case, the first and second mounting members 121 and 123 may be connected to each other.

According to the embodiment, the relay module 110 may be manufactured in a form shown in FIGS. 4a and 4b.

In detail, the first and second mounting members 121 and 123 may be arranged in parallel to each other. The first mounting member 121 may be connected to one of side surfaces of the second mounting member 123. In this case, a size of the first mounting member 121 may be equal to that of the second mounting member 123. Differently from the above, the size of the first mounting member 121 may be smaller than that of the second mounting member 121.

All the antenna devices 111 and 113 may be mounted on the same surface of the mounting member 120. That is, all the antenna devices 111 and 113 may be mounted on a top surface of the mounting member 120. In this case, the first antenna device may be mounted on a top surface of the first mounting member 121, and the second antenna device 113 may be mounted on a top surface of the second mounting member 123. A size of the first antenna device 111 may be equal to that of the second antenna device 113. For example, an outer diameter of the first antenna device 111 may be equal to that of the second antenna device 113. The size of the first antenna device 111 may be smaller than that of the second antenna device 113. For example, the outer diameter of the first antenna device lll may be less than that of the second antenna device 113.

Thus, the relay module 110 of the embodiment may be assembled in a form shown in FIG. 4c. In detail, the relay module 110 may have a folding structure.

The correction member 130 allows the shape of the case apparatus 100 to be maintained. In this case, the correction member 130 is interposed between the first and second mounting members 121 and 123. In this case, the correction member 130 may separate the first and second mounting members 121 and 123 from each other. That is, the correction member 130 may separate the first and second antenna devices 111 and 113 from each other. In addition, the correction member 130 may be formed in a single-layered structure or a multi-layered structure. Thus, the first and second mounting member 121 and 123 are disposed opposite each other while interposing the correction member 130 therebetween.

Selectively, the correction member 130 may include a battery. The battery supplies power to the mobile communication terminal 11 in the case apparatus 100. In this case, the battery includes an output terminal (not shown) and an input terminal (not shown). A connection terminal is connected to the mobile communication terminal 11 to output the power of the battery to the mobile communication terminal 11. The input terminal is connected to an external power source to allow the power of the external power source to be input to the battery. In this case, though not shown, the connection terminal and the input terminal may be exposed to an outside by the protective part 140.

The protective part 140 is mountable on the mobile communication terminal 11 in the case apparatus 100. That is, the protective part 140 may be mounted on and detached from the mobile communication terminal 11. In this case, the protective part 140 may adhere closely to a rear surface of the mobile communication terminal 11. In this case, the protective part 140 may extend toward a side surface of the mobile communication terminal 11, but the embodiment is not limited thereto. The protective part 140 may be formed of a plastic material.

In addition the antenna devices 111 and 113, the mounting member 120 and the correction member 130 are encapsulated with the protective part 140 in the case apparatus 100. The protective part 140 couples the antenna devices 111 and 113, the mounting member 120 and the correction member 130 to each other in the case apparatus 100. In this case, an accommodating space is formed in the protective part 140. That is, the protective part 140 accommodates the antenna devices 111 and 113, the mounting member 120 and the correction member 130 in the accommodating space.

Figure 5:
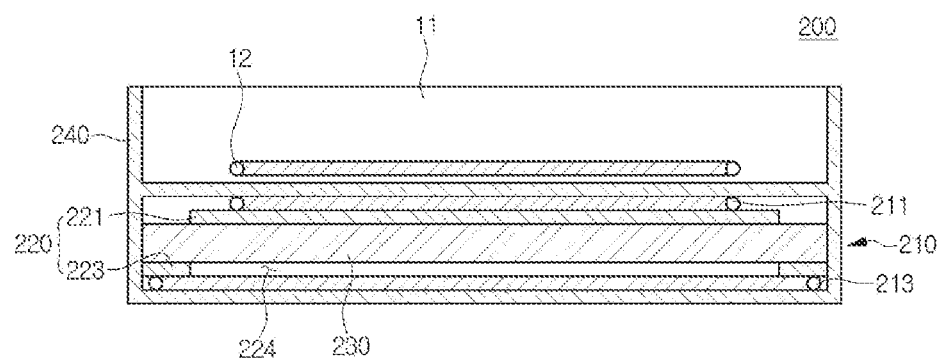
FIG. 5 is a sectional view showing a case apparatus according to the second embodiment.
Figure 6A:
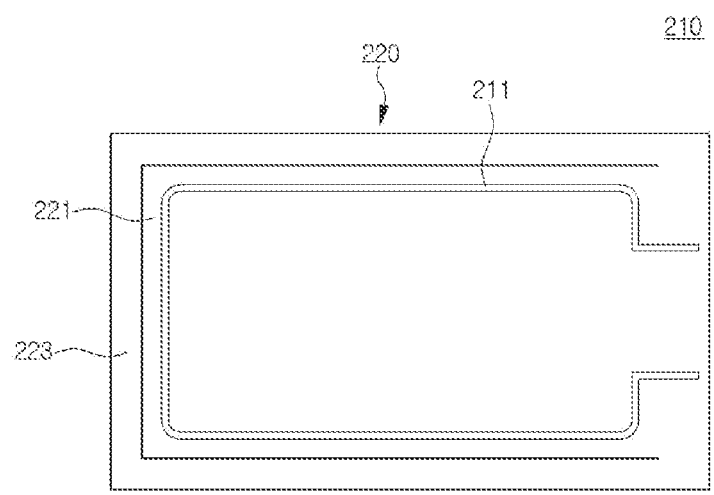
FIGS. 6a, 6b and 6c are views showing the first example of the relay module of FIG. 5.
Figure 6B:
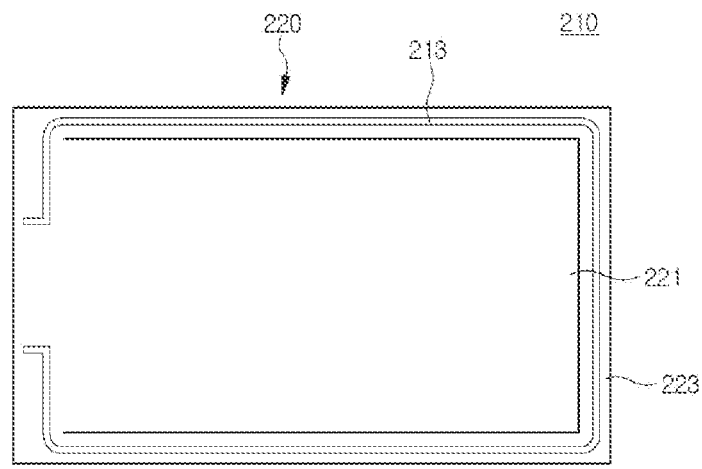
Figure 6C:
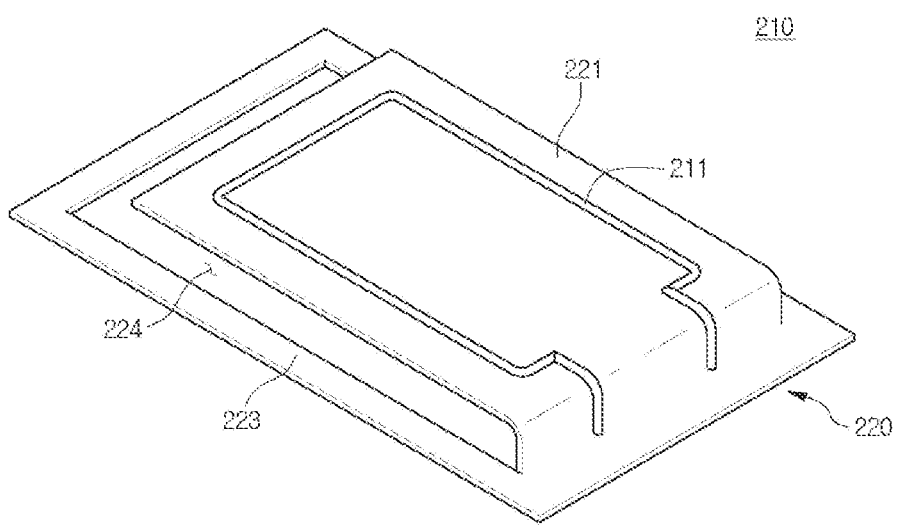
Figure 7A:
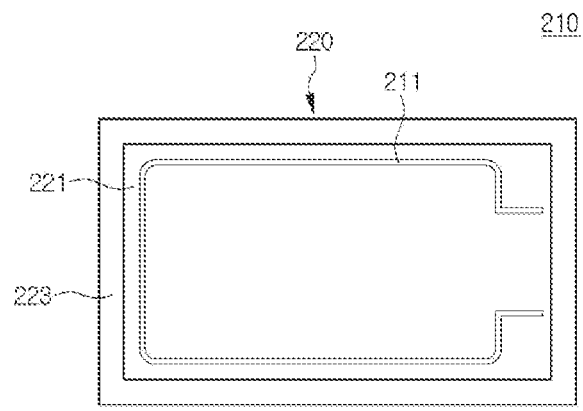
FIGS. 7a, 7b, 7c, 7d, and 7e are views showing the second example of the relay module of FIG. 5.
Figure 7B:
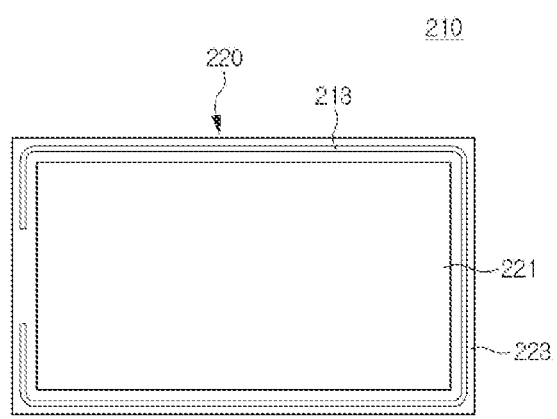
Figure 7C:
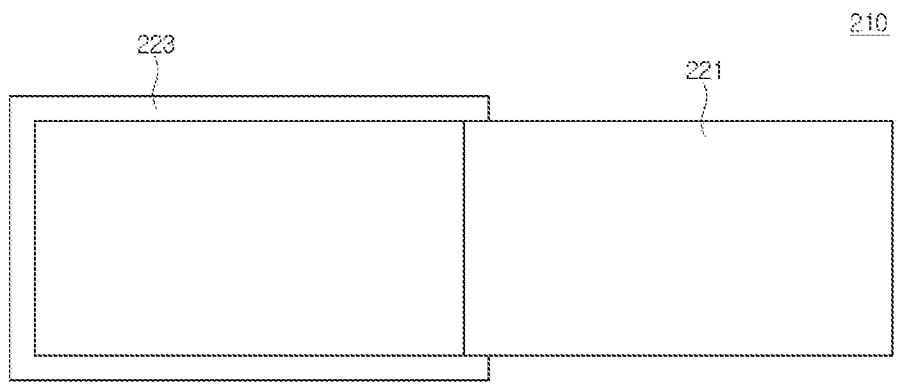
Figure 7D:
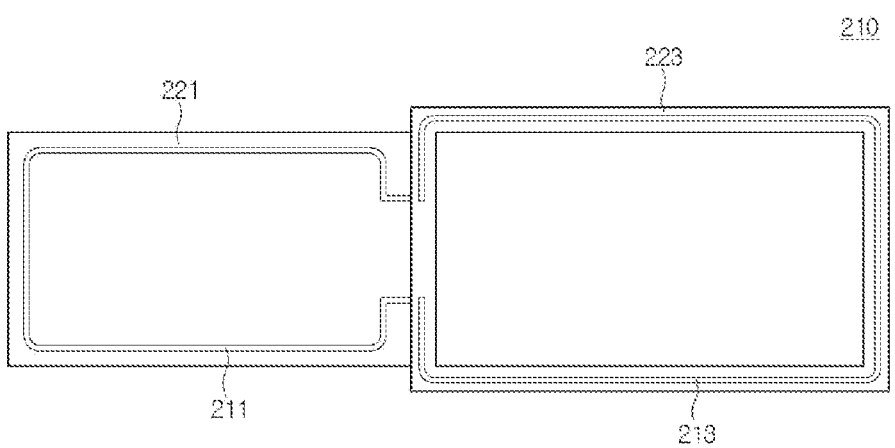
Figure 7E:
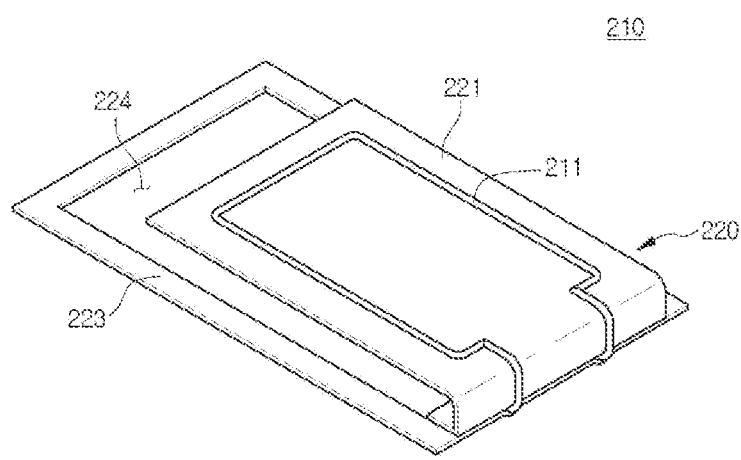

FIG. 5 is a sectional view showing a case apparatus according to the second embodiment. FIGS. 6a, 6b and 6c are views showing the first example of the relay module of FIG. 5. FIGS. 7a, 7b and 7c are views showing the second example of the relay module of FIG. 5. In this case, FIGS. 6a, 6b, 7a, 7b and 7c show schemes of manufacturing the relay module, where the FIGS. 6a, 7a and 7c are plan views of the relay module and FIGS. 6b, 7b and 7d are back views of the relay module. In addition, FIGS. 6c and 7e are perspective views illustrating schemes of assembling the relay module.

Referring to FIG. 5, the case apparatus 200 of the embodiment includes a relay module 210, a correction member 230 and a protective part 240, where the relay module 210 includes antenna devices 211 and 213 and a mounting member 220. In this case, since basic configurations of the relay module 210, the correction member 230 and the protective part 240 are similar to those of the previously described embodiment, the details will be omitted.

However, the relay module 210 may be manufactured in forms shown in FIGS. 6a and 6b.

In detail, the second mounting member 223 may be formed to surround the first mounting member 221. That is, the first mounting member 221 is formed to have a size smaller than the second mounting member 223. In this case, an exposing part 224 may be formed in a central area of the second mounting member 223. In this case, the exposing part 224 may be formed to have a size corresponding to the first mounting member 221. In addition, the first mounting member 221 may be inserted into the exposing part 224 and be accommodated in the exposing part 224. In other words, the second mounting member 223 may be formed by edge regions of the exposing part 224. In addition, the first mounting member 221 may be connected to one of inner side surfaces of the exposing part 224 in the second mounting member 223. In this case, the first mounting member 221 may extend from one of edge regions of the second mounting member 223.

The antenna devices 211 and 213 may be individually mounted on mutually different surfaces of the mounting member 220. To this end, a size of the first antenna device 211 is smaller than that of the second antenna device 213. For example, an outer diameter of the first antenna device 211 may be less than an inner diameter of the second antenna device 213. That is, the first antenna device 211 may be mounted on a top surface of the first mounting member 221, and the second antenna device 213 may be mounted on a bottom surface of the second mounting member 223. In this case, both ends of the first antenna device 211 and both ends of the second antenna device 213 may extend to one of the edge regions of the second mounting member 223. In addition, the antenna devices 211 and 213 may be connected to each other through the mounting member 220. In this case, at least one of the first and second antenna devices 211 and 213 may pass through the second mounting member 223.

Thus, the relay module 210 of the embodiment may be manufactured in a form shown in FIG. 6c. In detail, the relay module 210 may have a folding structure. In this case, the first mounting member 221 may extend along one of side surfaces of the correction member 230. In addition, both ends of the first antenna device 211 may extend along one of the side surfaces of the correction member 230.

In this case, a length of the mounting member 220 may be determined in the extending direction of the first mounting member 221. For example, the length of the mounting member 220 may be equal to 55 mm. In this case, a length of the first mounting member 221 may be equal to about 47 mm. However, it may be assumed that a thickness of the correction member 230 is equal to about 3 mm. In addition, the thickness of the mounting member 220 may be determined in a perpendicular direction to the extending direction of the first mounting member 221. For example, the thickness of the mounting member 220 may be equal to 48 mm.

In this case, the thickness of the first mounting member 221 may be equal to about 40 mm. That is, each width of the edge regions of the second mounting member 223 may be equal to about 4 mm.

Meanwhile, the relay module 210 of the embodiment may be manufacture in forms shown in FIGS. 7a to 7d.

In detail, as shown in FIGS. 7a and 7b, the second mounting member 223 may be formed to surround the first mounting member 221. That is, the first mounting member 221 is formed to have a size smaller than the second mounting member 223. In this case, an exposing part 224 may be formed in a central area of the second mounting member 223. In this case, the exposing part 224 may be formed to have a size corresponding to the first mounting member 221. In addition, the first mounting member 221 may be inserted into the exposing part 224 and be accommodated in the exposing part 224. In other words, the second mounting member 223 may be formed at edge regions of the exposing part 224.

The antenna devices 211 and 213 may be individually mounted on mutually different surfaces of the mounting member 220. To this end, a size of the first antenna device 211 is smaller than that of the second antenna device 213. That is, the first antenna device 211 may be mounted on a top surface of the first mounting member 221, and the second antenna device 213 may be mounted on a bottom surface of the second mounting member 223. In this case, both ends of the first antenna device 211 may extend to one side on the first mounting member 221, and both ends of the second antenna device 213 may extend to one of the edge regions of the second mounting member 223. In this case, both ends of the first antenna device 211 may pass through the first mounting member 221. In addition, the second antenna device 213 may pass through the second mounting member 223.

In addition, as shown in FIGS. 7c and 7d, the first and second mounting members 121 and 123 may be connected to each other. That is, the first mounting member 221 may extend to be connected to one of the edge regions of the second mounting member 223. In this case, the first mounting member 221 may adhere to a top or bottom surface of one of the edge regions of the second mounting member 223. For example, the first and second mounting members 221 and 223 may adhere to each other with an adhesive material (not shown). In addition, the antenna devices 211 and 213 may be connected to each other. In this case, at least one of the first and second antenna devices 211 and 213 passes through the mounting member 220, such that the antenna devices 211 and 213 are connected to each other.

Thus, the relay module 210 may be assembled in a formed shown in FIG. 7e. In detail, the relay module 210 may have a folding structure. In this case, the first mounting member 221 may extend along one of side surfaces of the correction member 230. In addition, both ends of the first antenna device 211 may extend along one side surfaces of the correction member 230.

In this case, a length of the mounting member 220 may be determined in the extending direction of the first mounting member 221. For example, the length of the mounting member 220 may be equal to 55 mm. In this case, a length of the first mounting member 221 may be equal to about 47 mm. However, it may be assumed that a thickness of the correction member 230 is equal to about 3 mm. In addition, the thickness of the mounting member 220 may be determined in a perpendicular direction to the extending direction of the first mounting member 221. For example, the thickness of the mounting member 220 may be equal to 48 mm.

In this case, the thickness of the first mounting member 221 may be equal to about 40 mm. That is, each width of the edge regions of the second mounting member 223 may be equal to about 4 mm.

Figure 8:
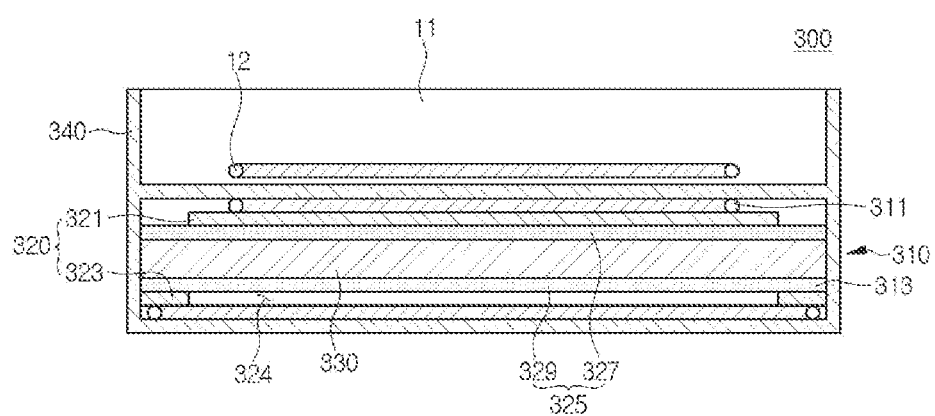
FIG. 8 is a sectional view showing a case apparatus according to the third embodiment.

FIG. 8 is a sectional view showing a case apparatus according to the third embodiment.

Referring to FIG. 8, the case apparatus 300 of the embodiment includes a relay module 310, a correction member 330 and a protective part 340, where the relay module 210 includes antenna devices 311 and 313 and a mounting member 320. In this case, since basic configurations of the relay module 310, the correction member 330 and the protective part 340 are similar to those of the previously described embodiment, the details will be omitted.

However, the relay module 310 further includes a shielding member 325. The shielding member 325 shields the antenna devices 311 and 313. In this case, the shielding member 325 is interposed between the first and second mounting members 321 and 323. In addition, the shielding member 325 may be formed in a single-layered structure or a multi-layered structure.

In this case, the shielding member 325 may be formed of ferrite. That is, the shielding member 325 may include metallic particles and a resin material. In this case, the metallic particles may include soft magnetic metallic particles, for example, aluminum (Al), metal silicon and iron oxide (FeO; Fe3O4; Fe2O3). In addition, the resin material may include thermoplastic resin such as polyolefin elastomer.

The shielding member 325 includes first and second shielding members 327 and 329. The first shielding member 327 is disposed opposite the first antenna device 311 in the case apparatus 300. In this case, the first shielding member 327 may be disposed between the first mounting member 321 and the correction member 330. The second shielding member 329 is disposed opposite the second antenna device 313 in the case apparatus 300. In this case, the second shielding member 329 may be disposed between the second mounting member 323 and the correction member 330. In this case, the shielding member 325 may have a folding structure.

According to the embodiment, the case apparatus 100, 200 or 300 may be mounted on the mobile communication terminal 11, thereby protecting the mobile communication terminal 11 and improving the appearance of the mobile communication terminal 11. In this case, the case apparatus 100, 200 or 300 includes the correction member 130, 230 or 330 so that the case apparatus 100, 200 or 300 may be more effectively protect the mobile communication terminal 11. In addition, since the correction member 130, 230 or 330 includes a battery, the case apparatus 100, 200 or 300 may supply power to the mobile communication terminal 11.

In addition, the relay module 110, 120 or 310 of the case apparatus 100, 200 or 300 may relay short range communication between the mobile communication terminal 11 and the external device 15. That is, the relay module 110, 210 or 310 may relay signals transmitted from and to the mobile communication terminal 11. Thus, the performance of the mobile communication terminal 11 may be prevented from being degraded due to the case apparatus 100, 200 or 300.

Meanwhile, it should be understood that the disclosure is not limited to the embodiments and may be embodied in different ways, and that the embodiments are given to provide complete disclosure and to provide thorough understanding to those skilled in the art. In other words, it will be understood by those of ordinary skill in the art that various substitutions, changes in form and alterations may be made therein without departing from the spirit and the scope of the disclosure.

What is claimed is:

1. A case apparatus comprising:
a mounting member including a first mounting member and a second mounting member integrally formed with each other, wherein the first mounting member and the second mounting member are connected at one side and separated at three sides;
a first antenna device mounted on a top surface of the first mounting member; and
a second antenna device mounted on a bottom surface of the second mounting member,
wherein the second mounting member includes an exposing part which has a same size as the first mounting member, and
wherein the first mounting member includes a bent part whereby the first mounting member is separated from the second mounting member at the three sides.

2. The case apparatus of claim 1, wherein the second mounting member is provided with the exposing part corresponding to the first mounting member.

3. The case apparatus of claim 2, wherein the first mounting member is connected to one of inner side surfaces of the exposing part in the second mounting member.

4. The case apparatus of claim 2, wherein the first mounting member is connected to a top or bottom surface of one of edge regions of the exposing part in the second mounting member.

5. The case apparatus of claim 1, further comprising a correction member disposed between the first and second mounting members.

6. The case apparatus of claim 5, wherein the correction member includes a battery.

7. The case apparatus of claim 5, wherein the first mounting member extends along one of side surfaces of the correction member.

8. The case apparatus of claim 1, wherein the first and second antenna devices are connected to each other.

9. The case apparatus of claim 8, wherein the first and second antenna devices include a coil.

10. The case apparatus of claim 9, wherein at least one of the first and second antenna devices further includes a reactance device connected to the coil.

11. The case apparatus of claim 10, wherein the reactance device includes a capacitance device.

12. The case apparatus of claim 1, further comprising at least one shielding member disposed between the first and second mounting members.

13. The case apparatus of claim 1, wherein the mounting member includes one of a PCB, an FPCB, a film and a shielding member.

14. The case apparatus of claim 1, further comprising a protective part to encapsulate the mounting member, and the first and second antenna devices such that the mounting member and the first and second antenna devices are coupled to each other.

15. The case apparatus of claim 14, wherein the protective part is detachably mounted on a mobile communication terminal.

16. The case apparatus of claim 15, wherein the first and second antenna devices relay short range communication between the mobile communication terminal and an external device.

17. The case apparatus of claim 16, wherein the short range communication includes NFC (Near Field Communication).

* * * * *